United States Patent

Gawad et al.

[11] Patent Number: 6,054,160
[45] Date of Patent: Apr. 25, 2000

[54] COMPOSITIONS AND PROCESSES FOR MAINTAINING THE FRESH SENSORY ATTRIBUTES OF FRESHLY-CUT APPLES

[75] Inventors: Kamelya I. Gawad; Hesham A. Gawad, both of Fresno, Calif.

[73] Assignee: EPL Technologies, Inc., Philadelphia, Pa.

[21] Appl. No.: 08/891,885

[22] Filed: Jul. 14, 1997

[51] Int. Cl.⁷ .......................... A23B 7/154; A23B 7/157
[52] U.S. Cl. .................. 426/270; 426/267; 426/615; 426/654
[58] Field of Search ................... 426/270, 267, 426/654, 615

[56] References Cited

U.S. PATENT DOCUMENTS

| | | | |
|---|---|---|---|
| 2,011,465 | 8/1935 | Balls et al. ........................ | 426/270 |
| 2,589,591 | 3/1952 | Xander . | |
| 2,631,104 | 3/1953 | Welker et al. . | |
| 3,851,078 | 11/1974 | Khayat et al. . | |
| 3,895,119 | 7/1975 | Grom . | |
| 4,818,549 | 4/1989 | Steiner et al. . | |
| 4,832,969 | 5/1989 | Lioutas . | |
| 4,911,940 | 3/1990 | Steiner et al. . | |
| 4,956,190 | 9/1990 | Chawan et al. . | |
| 4,996,070 | 2/1991 | Nafisi-Movaghar .................. | 426/425 |
| 5,055,313 | 10/1991 | Warren . | |
| 5,059,438 | 10/1991 | McEvily et al. . | |
| 5,547,693 | 8/1996 | Krochta et al. ..................... | 426/270 |

OTHER PUBLICATIONS

Ashurst, P. Production and Packaging of Non–Carbonated Fruit Juices and Fruit Beverages, Blackie Academic and Professional, London, p. 159, 1995.
Pitotti, A. et al. "Control of enzymatic browning". Engineering and Food, vol. 1, pp. 671–681, 1990.
Nicoli, M.C. et al. "Effect of some substances on polyphenoloxidase", Industria Conserve 66 (3), pp. 234–237, 1991.
Amiot, M.J. et al., 1992, Phenolic composition and browning susceptability of various apple cultivars at maturity. J. Food Sci. 56:958.
Coseteng, M.Y. and Lee, C.Y., 1987, Changes in apple polyphenol oxidase and polyphenol concentrations in relation to degree of browning. J. Food Sci. 52:985.
Janovitz–Klapp, A.H. et al., 1990., Inhibition studies on apple polyphenol oxidase. J. Agric. Food Chem. 38:926.
Monsalve–Gonzales, A. et al., 1993, Mass transfer and textural changes during processing of apples by combined methods.
Monsalve–Gonzalez, A. et al., 1993, Control of browning during storage of apple slices preserved by combined methods. 4–Hexylresorcinol as anti–browning agent. J. Food Sci. 58:797.
Molnar–Perl, I., and Friedman, M., 1990, Inhibition of browning amino acids. 3. Apples and potatoes. J. Agric. Food Chem. 38:1652.
Molnar–Perl, I. and Friedman, M., 1990, Inhibition of browning by sulfur amino acids. 2. Fruit juices and protein-containing foods. J. Agric. Food Chem. 38:1648.
Pizzocaro, F. et al., 1993, Inhibition of apple polyphenol oxidase (PPO) by ascorbic acid, citric acid and sodium chloride. J. Food Proc. and Pres. 17:21.
Richard, F.C. et al., 1991, Cysteine as an inhibitor of enzymatic browning. 1. Isolation and characterization of addition compounds formed during oxidation of phenolics by apple polyphenol oxidase. J. Agric. Food Chem. 38:841.
Sapers, G.M. et al., 1989, Control of enzymatic browning in apple with ascorbic acid derivatives, polyphenol oxidase inhibitors, and complexing agents, J. Food Sci. 54:997.
Sapers, G.M. et al., 1990, Application of browning inhibitors to cut apple and potato by vacuum and pressure infiltration. J. Food Sci. 55:1049.
Sapers, G.M.: Ziolkowski, M.A., 1987, Comparison of erythorbic and ascorbic acids as inhibitors of enzymatic browning in apple. J. Food Sci. 52:1732–1733.

*Primary Examiner*—Helen Pratt
*Attorney, Agent, or Firm*—Clifford W. Browning; Woodard, Emhardt, Naughton, Moriarty & McNett

[57] ABSTRACT

Compositions and processes are disclosed for treating fresh-cut apple pieces by dipping cut apple pieces in an aqueous solution containing GRAS (Generally Recognized As Safe) substances that protect the cut apple pieces from deterioration due to increased enzymatic activity, oxidative reactions, water migration and microbial effects during the extended shelf life of the fresh-cut apples pieces. The composition consists principally of L-cysteine, sorbitol and calcium chloride. A chelator such as sodium hexametaphosphate can be added to enhance the affiance of the agent. A synergistic effect is observed when apple pieces are packaged in a film that will equilibrate to oxygen and carbon dioxide levels in the range of 0.5–5.0% and 7.0–37.0%, respectively.

10 Claims, No Drawings

COMPOSITIONS AND PROCESSES FOR MAINTAINING THE FRESH SENSORY ATTRIBUTES OF FRESHLY-CUT APPLES

This invention relates to compositions and processes that maintain the integrity of fruit that generally exhibits loss of color, loss of texture, and changes in flavor or aroma when cut, and is more specifically related to compositions and processes that are effective in preventing the discoloration, loss of texture, and changes in flavor of freshly-cut apples.

BACKGROUND OF THE INVENTION

When fruit tissue is cut or injured, physiological changes occur. These changes are exemplified by the production of ethylene, by a change in color due to oxidative reactions, by moisture migration, and by a diversity of enhanced enzymatic activity, all of which lead to deterioration in the quality of the fruit tissue and a decline in sensory attributes, such as the texture and flavor typically associated with fresh fruit. The organoleptic characteristics of fruit are greatly modified by the accumulation of brown pigments that replace the natural color of the fruit tissue. Although some browning may be nonenzymatic, most of the browning in fruit tissue is due to enzymatic oxidation of phenolic compounds when they mix with polyphenol oxidases upon cutting or wounding of the tissue. Such changes are considered to be signs of deterioration that lower the fruit quality both visually and with regard to other sensory attributes, such as flavor and texture. Deterioration can subsequently lead to increased microbial growth.

The retention of fresh flavor and texture are also very important to the eating quality of freshly-cut fruit, and it is the delicate and complex flavors of fruit that are extremely susceptible to change when fruit is freshly cut. Driven by consumer interest and demand for convenience, freshly cut vegetables have received the most emphasis by technologists. As new cut vegetable products with acceptable shelf life have been successfully introduced into the market, there has been an increasing interest in the development of freshly cut fruit as the next generation of ready-to-eat cut produce.

Discoloration of freshly cut fruit is the most noticeable loss of quality and is of considerable economic importance. As the food becomes unsightly, it signifies that the food is no longer edible. The appearance of cut fruit is generally considered significant from a safety point of view. Cut fruit is considered safe for consumption only as long as it looks good. In fact, it is important that it look bad before it actually becomes unsafe to eat due to the presence of undesirable microorganisms.

Discoloration of freshly cut fruit has received the most attention by the technologists because of the visibility and economic impact of discoloration. The browning and blackening of cut tissue is due to the mixing of enzyme and substrate. This discoloration response to cutting is often attributed to the oxidation of the substrates, i.e. o-hydroxyphenols, such as chlorogenic acid, which is catalyzed by polyphenol oxidase (PPO) enzyme.

Oxidative browning of cut fruits has been the subject of several reviews (Vamos-Vigyazo, L. Crit. Rev. Food Sci. Nutr. 1981, Vol. 15, pp. 49–127 1981; Whitaker, 1985; Mayer, A. M. Phytochemistry 1987 Vol. 26, pp. 11–20; Marques, L. In Enzymatic Browning and its Prevention, 1995, pp. 90–102). The majority of polyphenoloxidases that are involved in the browning of fruits are catecholoxidases (Mayer, A. M.; Harel, E. In Food Enzymology; Fox, P. F., Eds; Elsevier Applied Sciences London, 1991, pp. 373–398), also designated o-diphenoloxidases. Overall studies indicate high heterogeneity in expression of PPO in the fruit that may be due to differential genomic expression in species, the physiological age of the fruit, or the biochemical and physiological nature of the tissue studied. The activity and mode of action of PPO has been reviewed by Vamos-Vigyazo, supra; Whitaker, supra; Mayer, 1987 supra. It is a copper-requiring enzyme that in the presence of oxygen catalyzes the oxidation of phenolic substrates, such as chlorogenic acid, to quinones, which through subsequent reactions are polymerized to brown, pink or black pigments.

There are numerous reports of polyphenol oxidase (PPO) isozymes causing discoloration in apples, potatoes, grapes, avocados, parsnips, peaches and pears. PPO activity has been detected in all fruit tissue including the peel, flesh, and cortex (Macheix, J. J.; Fleuriet, A.; Billot, J. J., Fruit Phenolics; CRC Press; Boca Raton, Fla., 1990, pp. 295–312). Activity is mainly concentrated in the peel and the cortex with chlorogenic acid oxidase localized mainly at the core of the apple fruit and near the skin (Munata, P.,1981, Am. Pot. J. Vol. 58, pp. 85). Munata supra reports that enzymatic browning in potatoes can be mitigated by inhibiting PPO activity by adjusting the pH, adding bisulfite or sulfhydryl compounds, chelating the copper from PPO, using reducing compounds that reduce the whole- quinones to the o-hydroxyphenol state, or applying chemicals which react with o-quinone to yield colorless additive products.

According to Mayer and Harel (Mayer, A. M.; Harel, E., 1979, Phytochemistry Vol. 18, pp. 193–215), inhibitors of PPO can be grouped into two classes: compounds that interact with the copper moiety and those that affect the active site for the phenolic substrate, such as chlorogenic acid. Grom (U.S. Pat. No. 3,895,119 issued July, 1975) teaches the application of calcium chloride in combination with sulfite or ascorbic acid to the cut surface of plant tissue, wherein the calcium helps to maintain texture and the sulfite or ascorbic acid inhibits discoloration. Steiner (U.S. Pat. No. 4,818,549 issued April, 1989 and U.S. Pat. No. 4,911,940 issued March, 1990) teaches the combination of citric acid, calcium chloride, and sodium chloride for use in maintaining the color of the cortex of the fruit tissue, and Warren (U.S. Pat. No. 5,055,313 issued August, 1991) presents a combination of ascorbic acid, calcium chloride, or other sources of halides, citric acid, and sodium acid pyrophosphate to maintain the integrity of cut plant tissue. However, the methods of Steiner supra and Warren supra provide shelf life of less than four days.

Pizzocaro, et al. (J. Food Proc. and Pres. 1993, Vol. 17, pp. 21) has reported inhibition of PPO activity in apples using a mixture of ascorbic acid, citric acid and sodium chloride. Sapers (Sapers, G. M., Ziolkowski, M. A.,; J. Food Sci. 1987, Vol. 52, pp. 1732–1733) reported the use of ascorbic acid and erythorbic acid to inhibit PPO activity in apple tissue and in apple cider. Sapers et al. (Sapers, G. M. et al. J. Food Sci. 1989, Vol. 54, pp. 997) evaluated ascorbic acid derivatives for their capacity to inhibit browning in apple juice and apple tissue. Ascorbic acid -2-phosphate and -triphosphate showed promise for cut apple pieces but were not effective in juice. Ascorbic acid -6-fatty acid esters showed anti-browning activity in juice.

Monsalve-Gonzalez et al. (Monsalve-Gonzalez, A. et al., J. Food Sci. 1993, Vol. 58, pp. 797) demonstrated efficacy of 4-hexylresorcinol in retarding browning in apple pieces and further demonstrated that in combination with vacuum packaging browning inhibition could be achieved for several weeks. McEvily (U.S. Pat. No. 5,059,438 issued October 1991) discloses the use of resorcinol derivatives as inhibitors of enzymatic browning in foods and beverages. Cysteine, as a reducing agent, has been demonstrated to mitigate browning of tissue by reacting with o-quinones to form colorless addition products or by reducing the o-quinones to their phenol precursors (Richard-Forget, F. C., et al., J. Agric. Food Chem. 1992, Vol. 40, pp. 2108) (Richard, 1991). The authors report that cysteine has no direct effect on apple PPO activity. Janovitz-Klapp (Janovitz-Klapp, A. H. et al., J. Agric. Food Chem. 1990, Vol. 38, pp. 926) carried out studies on the inhibition of PPO. When they added ascorbic acid, cysteine, or bisulfite color formation was retarded. Molnar-Perl and Freidman (Molnar-Perl, I.; Friedman, M.; 1990 J. Agric. Food Chem. Vol. 38, pp. 1652) revealed that SH-containing N-acetyl-L-cysteine and reduced glutathione were almost as effective as sodium sulfite in preventing enzymatic and nonenzymatic browning of apple juice.

Calcium chloride has been reported to maintain the texture of fruit tissue, but calcium has not been implicated in the inhibition of browning.

In 1994, apple production in the United States was reported to be 10,634.8 million pounds, with per capita consumption at about 17 lbs. With continued planting of apple trees and continued increase in yields and total fruit harvested, the search is on for the development of diverse apple markets to maintain the demand for apples and to sustain price. A considerable volume of apples are sliced, treated with an anti-browning inhibitor and refrigerated or frozen to provide apple pieces for the baking industry. More recently there has evolved considerable interest in supplying fresh-like quality apple pieces to retail and food service markets where consumer expectations are for a fresh-tasting apple slice.

The problems with the apple pieces that are currently sold to the baking industry is that they still discolor to some degree even though they are treated with sulfites and preservatives (and are thus no longer "fresh" by FDA definition), and they are subjected to handling and freezing operations that result in the loss of texture associated with freshly-cut quality. Sulfites also tend to cause translucency of the apple tissue. Furthermore, most mixtures of anti-browning treatments now in use alter the flavor of the apple pieces, or fail to maintain a flavor profile similar to a freshly cut apple slice. To date no treatment other than sulfite-based treatments has been able to maintain the color of freshly cut apple pieces. Thus, to date, technology does not exist that will maintain the quality of freshly cut apple pieces over an acceptable shelf life without the use of prior art sulfites and preservatives.

While no single agent has been found to replace sulfites, numerous combinations of agents have been tried, but all have failed to date to provide shelf life stability to freshly cut apple pieces and to maintain the sensory characteristics associated with freshly-cut apple pieces.

SUMMARY OF THE INVENTION

Compositions and processes are disclosed for treating fresh-cut apple pieces by dipping cut apple pieces in an aqueous solution containing a synergistic combination of GRAS (Generally Recognized As Safe) chemicals that protect the cut apple pieces during an extended shelf life from deterioration due to increased enzymatic activity, oxidative reactions, water migration and microbial effects. Cut apple tissue may be treated by contacting the cut apple pieces with an aqueous solution containing the composition of the present invention, removing the excess composition from the apple tissue, and then packaging the apple pieces in a protective film that further retards oxidative reactions. This film may be a barrier film of very low oxygen transmission and the apple slices would be packaged under vacuum or in a nitrogen environment. Alternatively, a breathable film of low oxygen transmission may be used and the apple slices would be packaged in a modified atmosphere or in the normal atmosphere and the film itself will yield a modified atmosphere. The combination of treatment compositions, process, and packaging maintains the integrity of the freshly cut apple tissue for 14–20 days.

The GRAS materials utilized in the preferred embodiments of the present invention are edible agents that are compatible with each other, that are freely soluble in water, and that provide a simple and effective dipping solution. The preferred compositions of the present invention include: an antioxidant or reducing agent, a divalent cation to facilitate browning inhibition and maintain texture of the fruit pieces, and an osmolite to maintain cellular turgor pressure during treatment and to assist in retention of active components at the surface, and a chelator to remove metal catalysts of the enzymatic reactions.

The preferred compositions of the present invention consist principally of L-cysteine, sorbitol and calcium chloride in combination. A chelator, such as sodium hexametaphosphate, may also be added to enhance the efficacy of the other preferred constituents. Cysteine is preferably present in a concentration of about 1.00–4.00 g/l of solution, sorbitol preferably present at about 2.00 g/l, and calcium chloride preferably present at about 1.0–10.0 g/l. The concentrations of the constituents are altered to meet the different needs of specific apple cultivars, the different conditions of the raw apple materials (firmness, starch content, and soluble sugars), and the differing post-treatment distribution requirements.

Apple cultivars that have responded well to treatment with the compositions of the present invention, when combined with the appropriate modified atmosphere packaging, include Gala, Empire, Fuji, Granny Smith, Golden Delicious, Red Delicious, Idared Red, Pippin, Rome, and Gravenstein. A synergistic effect has been observed when apple pieces that have been treated with the compositions of the present invention are packaged in a protective film that will equilibrate the oxygen and carbon dioxide levels to the range of about 0.1–5.0% and about 7.0–30.0%, respectively.

The compositions, treatment parameters, packaging film, and packaging type (e.g. tray, bags) are selected based on the specific apple cultivar, the quality of the starting raw apple material, the final product specifications, and the intended distribution channels. The treatment protocol of the present invention is therefore tailored to meet the needs of particular apple processors.

The compositions and processes for maintaining fresh sensory attributes of freshly-cut apple pieces of the present invention together provide a fruit preservation system comprised of a combination of GRAS materials, processing and packaging, that maintains the fresh-like characteristics of freshly-cut apples over an extended shelf life and that imparts no off-color or taste to the apple pieces to which the compositions are applied. The fruit preservation system of the present invention effectively prevents the discoloration of apples when cut or wounded during processing and maintains the flavor and texture associated with freshly harvested apples. The apple preservation system of the present invention has been demonstrated to be an effective replacement for sulfite treatments, and thereby avoiding the tissue translucency problem often associated with the use of sulfites.

DETAILED DESCRIPTION OF THE PREFERRED EMBODIMENTS

In the following description of the preferred embodiments, all compositions are represented as percentages by weight (or g/l of aqueous solution) unless otherwise indicated. Composite mixtures are usually prepared by mechanically blending the desired components in the dry state. Obviously, other means of blending may be employed, and the components could be blended by adding them singularly to an aqueous medium to yield the specified blend in aqueous solution for use in the preferred processes of the present invention.

The antioxidant or reducing component of the preferred compositions of the present invention is preferably L-cysteine. Cysteine is normally added in the range of about 0.1–0.4% of the aqueous solution. The concentration selected depends on the apple cultivar, the condition of the raw apple material, the available temperature controls, and the required shelf life. Higher concentrations of the antioxidant component protects the cut apple surfaces from discoloring under conditions of temperature abuse, which accelerates the oxidative processes. L-cysteine has been determined to be the most effective inhibitor of discoloration. However, the stereoisomer, D-cysteine, or a mixture of D- and L-cysteine could also be used.

Most previous attempts to develop a blend of ingredients to inhibit browning of plant tissue have utilized high levels of organic acids that severely depress the pH of the solution, leading to increased damage to the plant tissue. Short exposure times and removal of the excess material mitigate much of this potential damage.

Upon cutting or wounding, some plant material, such as mushroom, apple, pear, and potato, rapidly discolors due to enzymatic activity. It has been further discovered that calcium in combination with cysteine improves the inhibition of discoloration in apple tissue. Calcium is preferably provided in the form of calcium chloride, but could be provided in the form of calcium lactate, at a concentration of the calcium ion of about 0.4% of the aqueous solution. As with other components of the invention, the concentration of calcium selected depends on the apple cultivar, the condition of the raw apple material, the available temperature controls, and the anticipated shelf life.

The third component of the preservative composition of the present invention is an osmolite. The osmolite assists in maintaining the turgor pressure of the cells of the apple tissue, thus preventing further injury to the cells. Further injury would result in the mixing of the substrate and enzymes and would lead to discoloration. It is also speculated that, during treatment, the osmolite, such as sorbitol, maintains the active ingredients, i.e. cysteine, in contact with the surface of the apple tissue for greater efficacy. Studies to date have also demonstrated the synergy of cysteine and sorbitol in inhibiting discoloration.

Although cysteine has been demonstrated to inhibit purified PPO activity, this knowledge has not been applied to the inhibition of browning in apple tissues. In fact, if only cysteine is applied and allowed to remain on the apple tissue, sulfur notes are detectable when the packaging is opened. Also, the use of cysteine alone does not address the maintenance of the other organoleptic properties of fruit tissue such as flavor and texture. If the maintenance of these attributes are not properly addressed there will be a significant loss of texture leading to browning and the development of off flavors, generally recognized as those notes resulting from fermentation and subsequent development of esters. However, if L-cysteine is combined with calcium chloride and sorbitol, with the concentration of cysteine at about 1.00–4.00 g/l of solution, calcium chloride at about 1.0–10.0 g/l of solution and sorbitol at about 2.00 g/l of solution, the color, texture and flavor associated with fresh apples is retained post-processing. A water solution of this mixture has been found to prevent discoloration of apple pieces, maintain the crisp texture, and avoid the occurrence of off flavors associated with prior art packaged apple pieces.

A fourth optional component of the preservative composition of the present invention is a metal ion chelator. The metal ion chelator may also be added to enhance the efficacy of the other preferred constituents of the preferred compositions of the present invention. Sodium hexametaphosphate has been the preferred metal ion chelator in testing completed to date. It proved to be more effective than sodium acid pyrophosphate (SAAP) or ethylenediamine tetraacetate (EDTA) or its salts.

It is most desirable to remove the excess preservative composition of the present invention from the apple tissue after treatment such that no off flavors are developed and such that the residual levels of the preservative compositions on the apple tissue are insignificant.

To deliver a consumable consumer product, treated apple pieces must also be placed in a package that limits the amount of oxygen available for oxidative reaction, which leads to discoloration. This is achieved by selecting semi-permeable films that upon reaching equilibration maintain oxygen levels at about 0.1–5.0% oxygen and about 7.0–30% carbon dioxide. Alternatively, an impermeable (barrier) film may be used and the apple slices packaged in nitrogen or under vacuum.

Therefore, treating apple tissue according to the preferred embodiments of the present invention, processing the apple tissue to remove any excess treatment, and packaging the tissue in an atmosphere of reduced oxygen and increased carbon dioxide has been found in testing completed to date to constitute an effective system for the preservation of the freshly-cut apple tissue that maintains the sensory properties associated with freshly-cut apple tissue over an extended shelf life. As prior art processes for preparing ready to eat fruit pieces include washing, chlorination, rinsing, inspection, and packaging, the system of the present invention readily fits most existing processing lines, and thus may be readily implemented and may immediately become very cost effective.

The compositions and processes of the present invention define a preservation system that embodies novel combinations of edible GRAS ingredients that in a single dip process provides surprising retention of sensory properties in cut apple tissue in conditions in which the integrity of the fruit would be otherwise difficult to maintain. Another advantage of the compositions and processes of the present invention is that treatment of cut apple tissue can be carried out over a broad range of temperatures, from 3° C. to ambient temperature. However, it is best if the treatment is applied at lower temperatures, as the rate of browning reactions and other deteriorative processes increase with temperature, and it can take considerable time after processing to lower the temperature of apple tissue to the desired post-treatment level.

The preferred constituents of the preferred compositions of the present invention are summarized below. Table 1 includes the function and preferred choice for each constituent and the preferred concentrations of each preferred constituent in solution.

TABLE 1

| Function | Component | Concentration Range |
|---|---|---|
| Antioxidant or Reducing Agent | L-cysteine, D-cysteine, D.L-cysteine | 0.1–0.4% |
| Preservation of Cell Wall and Cellular Membrane Integrity | Calcium chloride, Calcium lactate | 0.1–1.0% |
| Osmolite | Sorbitol | 0.2–1.0% |
| Metal Ion Chelator (optional) | Sodium hexametaphosphate, Calcium hexametaphosphate | 0.2–1.0% |

The preferred compositions of the present invention are most conveniently produced by blending the constituents in a dry particulate form by dry mechanical blending to insure that a uniform and consistent mixture is achieved. Solutions are made by solubilizing the constituents in dry particulate form in a suitable amount of water. Depending on the apple cultivar and the condition of the raw material, the treatment solution will preferably contain between about 1.0 and 3.0% of the dry formulation. Higher amounts may be used, but the benefits of extended shelf life have not been proportionally increased in testing completed to date, and there is a slight risk of developing off flavors in the apple tissue should too high a concentration be used. Satisfactory results are generally obtained when the treatment solution consists of about 1.0% of the dry formulation in solution.

It has been further noted in testing completed to date that to obtain maximum efficacy in the retention of the sensory attributes of freshly-cut fruit tissue, whole fruit is preferably washed, chlorinated, cut, rinsed and immersed in the preferred dipping solutions as described herein as quickly after cutting as practical in the commercial environment. A second rinse follows to minimize residuals and off-taste. To increase the efficacy in situations of inferior raw apple material or in more rapidly browning apple cultivars, the exposure time to the preferred treatment solutions may be extended. Generally the dipping exposure time is about 30–180 seconds, depending on the apple cultivar, condition of the raw apple material, and shelf life requirements.

The amount of each constituent of the preferred compositions of the present invention that contact the cut surface of the apple pieces will vary within certain limitations. However, the amount of each constituent that contacts the cut surface of the apple tissue is largely controlled by the concentration of the dry constituents of the compositions that is solubilized in aqueous solution. Most preferably, the aqueous solutions will contain by weight the amount of each constituent of the compositions of the present invention set forth in Table 1, above.

The following examples are provided herein to illustrate the preferred embodiments of the present invention. Each constituent of the compositions of the present invention either dry or in aqueous solutions is represented in weight percent of the solution, unless otherwise indicated.

EXAMPLE 1

A test solution (T2) was formulated as follows: a dry mixture of about 68.6% calcium chloride dihydrate, about 17.9% L-cysteine monohydrate and about 13.6% sorbitol was solubilized with water until the concentration of the mixture was about 1.48% of the resulting aqueous solution. Using this same formula, three additional test solutions were formulated, one without L-cysteine (T3), one without calcium choride (T4), and one without sorbitol (T5).

Whole Fuji and Red Delicious apples were scrubbed under running water and were then sanitized for two minutes in a 100 ppm chlorine solution (pH 6.0–7.0) at ambient temperature. The whole apples were then cored and sliced with the skins left on the pieces. One group of apple pieces was then dipped in ice-cold water (the control, T1), and four other groups were dipped in ice-cold test solutions T2, T3, T4 and T5 for 3 minutes. The treated pieces were then rinsed with water at the rate of 2 oz. per pound, were shaken to remove excess water, and were packaged in non-perforated film ($O_2$TR of 1400 $cm^{-2}$ $da^{-1}$) obtained from Respire Films, Inc. (Respire G80). The packages were heat sealed and stored at 39° F. for 7 days.

After 7 days, discoloration was evaluated with a Minolta Colorimeter ([L] and [a] values) and also visually. A subjective sensory evaluation was also made of the smell, taste, texture and surface moisture/dryness of each test group's pieces. Oxygen and carbon dioxide levels within the packages were measured using a $CO_2/O_2$ analyzer to provide an indication of the depletion of oxygen and to determine if the package environment was reaching anaerobic conditions. All data were recorded on 1, 2, or 3 replicates in this Example. The data of $CO_2$%, $O_2$%, [L] and [a] are presented in Tables 2 and 3, and the averages of the sensory evaluations are presented in Table 4. The effect of test solution T2 was taken as the reference point, and all data were calculated as above or below the effect of test solution T2, and this data is used in all Tables.

This Example demonstrates the synergy between cysteine, sorbitol, and calcium chloride for retarding the discoloration and maintaining the quality of Fuji and Red Delicious apple pieces over a 7-day storage period.

TABLE 2

| [L] and [a] Values by Minolta Colorimeterat day 7 at 39 F. | | | | | | |
|---|---|---|---|---|---|---|
| Cultivar | Parameter | | T1 | T2 | T3 | T4 | T5 |

| Cultivar | Parameter | | T1 | T2 | T3 | T4 | T5 |
|---|---|---|---|---|---|---|---|
| Red Delicious | | | | | | | |
| 1- | Measured Values | | | | | | |
| | [L] | Replicate 1 | 72.41 | 74.60 | 72.48 | 70.32 | 75.61 |
| | | Replicate 2 | 69.74 | 74.44 | 70.45 | 70.83 | 75.53 |
| | | Mean | 71.08 | 74.52 | 71.47 | 70.58 | 75.57 |
| | | Standard Deviation | 1.34 | 0.08 | 1.02 | 0.26 | 0.04 |
| | [a] | Replicate 1 | −2.08 | −5.41 | −0.79 | 1.33 | −4.73 |
| | | Replicate 2 | −0.53 | −5.25 | −0.42 | 1.77 | −5.84 |
| | | Mean | −1.31 | −5.33 | −0.61 | 1.55 | −5.29 |
| | | Standard Deviation | 0.78 | 0.08 | 0.19 | 0.22 | 0.56 |
| 2- | Calculated Values Above or Below T2 | | | | | | |
| | [L] | | −3.45 | 0.00 | −3.06 | −3.95 | 1.05 |
| | [a] | | 4.03 | 0.00 | 4.73 | 6.88 | 0.05 |
| 1- | Measured Values | | | | | | |
| | [L] | Replicate 1 | 71.61 | 76.72 | 71.46 | 76.27 | 78.45 |
| | | Replicate 2 | 70.94 | 76.82 | 71.64 | 74.45 | 77.03 |
| | | Mean | 71.28 | 76.77 | 71.55 | 75.36 | 77.74 |
| | | Standard Deviation | 0.33 | 0.05 | 0.09 | 0.91 | 0.71 |
| | [a] | Replicate 1 | 0.31 | −4.05 | 0.62 | −2.06 | −4.11 |
| | | Replicate 2 | 0.65 | −4.36 | −0.04 | −1.22 | −3.73 |
| | | Mean | 0.48 | −4.21 | 0.29 | −1.64 | −3.92 |
| | | Standard Deviation | 0.17 | 0.15 | 0.33 | 0.42 | 0.19 |
| 2- | Calculated Values Above or Below T2 | | | | | | |
| | [L] | | −5.50 | 0.00 | −5.22 | −1.41 | 0.97 |
| | [a] | | 4.69 | 0.00 | 4.50 | 2.57 | 0.28 |

TABLE 3

Effect on Headspace CO2 % and O2 % at Day 7 at 39 F.

| Cultivar Parameter | | | T1 | T2 | T3 | T4 | T5 |
|---|---|---|---|---|---|---|---|
| Red Delicious | | | | | | | |
| 1- | Measured Values | | | | | | |
| | CO2 % | Replicate 1 | 8.4% | 11.4% | 9.0% | 9.7% | 10.3% |
| | | Replicate 2 | 7.7% | 11.4% | 8.0% | 10.0% | 10.7% |
| | | Mean | 8.1% | 11.4% | 8.5% | 9.9% | 10.5% |
| | | Standard Deviation | 0.4% | 0.0% | 0.5% | 0.2% | 0.2% |
| | O2 % | Replicate 1 | 5.6% | 0.7% | 5.4% | 1.0% | 2.5% |
| | | Replicate 2 | 4.9% | 1.2% | 4.6% | 0.7% | 2.1% |
| | | Mean | 5.3% | 1.0% | 5.0% | 0.8% | 2.3% |
| | | Standard Deviation | 0.3% | 0.2% | 0.4% | 0.1% | 0.2% |
| 2- | Calculated Values Above or Below T2 | | | | | | |
| | CO2 % | | −3.4% | 0.0% | −2.9% | −1.5% | −0.9% |
| | O2 % | | 4.3% | 0.0% | 4.0% | −0.1% | 1.3% |
| 1- | Measured Values | | | | | | |
| | CO2 % | Replicate 1 | 11.9% | 13.4% | 11.2% | 13.6% | 12.9% |
| | | Replicate 2 | 12.4% | 12.6% | 12.5% | 13.3% | 11.6% |
| | | Mean | 12.2% | 13.0% | 11.9% | 13.5% | 12.3% |
| | | Standard Deviation | 0.3% | 0.4% | 0.7% | 0.1% | 0.7% |
| | O2 % | Replicate 1 | 1.9% | 0.9% | 1.2% | 0.4% | 1.1% |
| | | Replicate 2 | 5.7% | 0.6% | 0.5% | 0.5% | 0.4% |
| | | Mean | 3.8% | 0.8% | 0.9% | 0.4% | 0.7% |
| | | Standard Deviation | 1.9% | 0.2% | 0.4% | 0.1% | 0.3% |
| 2- | Calculated Values Above or Below T2 | | | | | | |
| | CO2 % | | −0.9% | 0.0% | −1.1% | 0.5% | −0.7% |
| | O2 % | | 3.1% | 0.0% | 0.1% | −0.3% | −0.0% |

TABLE 4

Sensory Evaluation of Main Parameters at day 7 at 39 F.

| Highly Unacceptable | Red Delicious* | | | | Fuji | | | |
|---|---|---|---|---|---|---|---|---|
| 5.0 | | | | | | | | |
| 4.5 | T1,3 | T1,3 | | | T1,3 | T1,3 | | |
| 4.0 | | | | | | | | |
| 3.5 | T4 | T4 | | | | | | |
| 3.0 | | | | | | | | |
| 2.5 | | | | | | | | |
| 2.0 | | | | | T4 | T4 | | |
| 1.5 | | T5 | T5 | | | | | |
| 1.0 BEST | T2,5 | T2 | T1,2,3,4 | T1,2,3,4,5 | T2,5 | T2,5 | T1,2,3,4,5 | T1,2,3,4,5 |
| Highly Acceptable | Color (surface) | Color (core) | Smell | Taste | Color (surface) | Color (core) | Smell | Taste |

*Texture of T4 was softer than T1, T2, T3 and T5.
T1 Control
T2 AF 249X3
T3 AF 249X3 less [L-Cysteine]
T4 AF 249X3 less [CaCl2]
T5 AF 249X3 less [Sorbitol]

With respect to the discoloration measurements made with the Minolta Colorimeter, the [L] and [a] values are presented in Tables 2 and 3 and are illustrated in relation to the values of [L] and [a] for the T2 test solution, i.e., above or below that of T2.

As compared with the control, or when one of the constituents was removed from the T2 test solution, the T2 test solution had the highest effect on minimizing discoloration. Removal of the L-cysteine constituent significantly reduced the effectiveness of the remaining two constituents, calcium chloride and sorbitol, to minimize discoloration to a level as close as 90–95% of that of the T1 control solution. Removal of the calcium chloride constituent significantly reduced the effectiveness of the remaining two constituents, L-cysteine and sorbitol, to minimize discoloration. For the Red Delicious cultivar, the level of discoloration in response to the removal of the calcium chloride constituent was higher than that experienced when L-cysteine was removed, indicating the significance and the essential role of calcium chloride in the T2 test solution. For the Fuji cultivar, the removal of the calcium chloride constituent also reduced the effectiveness of the test solution, but not as much as observed with the Red Delicious cultivar. Removal of the sorbitol constituent resulted in increased discoloration, however, the effect of sorbitol on discoloration may be marginal and may be dependent upon the physiological status of the apple cultivar.

With respect to the heads pace measurements of $CO_2$ and $O_2$, as a measure of metabolic activity, removal of any of the constituents of the T2 test solution may adversely effect the metabolic rate. The highest adverse effect on metabolic rate was observed when the sorbitol constituent was removed, and the least effect resulted when the L-cysteine constituent was removed. The effects on metabolic rates were also more pronounced with the Fuji cultivar than with the Red Delicious cultivar.

With respect to the sensory evaluations, the subjective color sensory evaluations were, in general, in line with the Minolta Colorimeter measurements. For the Red Delicious cultivar, the discoloration levels, in decreasing order, were the T1 control test solution (highly unacceptable), which was equal to or greater than the L-cysteine-free T3 test solution (highly unacceptable), which was greater than the calcium chloride-free T4 test solution (highly unacceptable), which was greater than the sorbitol-free T5 test solution (varied from highly acceptable to highly unacceptable), which was greater than the T2 test solution, which had the lowest discoloration rating and was judged best overall. For the Fuji cultivar, discoloration was highest for the T1 control test solution (highly unacceptable) and the L-cysteine-free T3 test solution (highly unacceptable). The calcium choride-free T4 test solution resulted in intermediate levels of discoloration (acceptable). The sorbitol-free T5 test solution and the T2 test solution produced highly acceptable color.

Only the removal of the calcium chloride constituent resulted in a softer texture of the Red Delicious cultivar.

Only the removal of the calcium or the sorbitol constituent negatively impacted the smell and taste of the treated apple pieces. The effect was not significant, however.

The combination of L-cysteine, calcium choride and sorbitol yielded the highest 'L' values, excellent visual quality and sufficiently high $O_2$ levels to avoid anaerobic conditions.

EXAMPLE 2

A test solution (T2) was formulated as follows, a dry mixture of about 55.5% calcium chloride dihydrate, about 14.4% L-cysteine monohydrate, about 11.0% sorbitol and about 19.1% sodium hexametaphospohate was solubilized with water until the concentration was about 1.83% of the resulting aqueous solution. Using this same formula, four additional test solutions were formulated, one without L-cysteine (T3), one without calcium chloride (T4), one without sorbitol (T5) and one without sodium hexametaphosphate (T6).

Whole Red Delicious apples were scrubbed under running water and were then sanitized for 2 minutes in a 100 ppm chlorine solution (pH 6.0–7.0) at ambient temperature. The whole apples were then cored and sliced with the skins left on the pieces. One group of apple pieces was then dipped in ice-cold water (the control, T1), and five other groups were dipped in ice-cold test solutions T2, T3, T4, T5, and T6 for 3 minutes. The treated pieces were then rinsed with water, and were packed and stored as described in Example 1. After 11 days, the pieces were evaluated as indicated in Example 1. The data are presented in Tables 5 and 6.

This Example demonstrates the synergy between cysteine, calcium chloride, sodium hexametaphosphate and sorbitol in retarding the discoloration and maintaining the quality of Red Delicious apple pieces over an 11-day period.

As compared with the control, T1, or when one of the constituents was removed from T2 test solution, i.e. T3, T4, T5 and T6, the T2 test solution exhibited the highest effect on minimizing discoloration. Removal of the L-cysteine constituent, T3, significantly reduced the effectiveness of the remaining three constituents, calcium chloride, sodium hexametaphosphate and sorbitol, in minimizing discoloration. Removal of calcium chloride constituent, T4, reduced the effectiveness of the remaining three constituents, L-cysteine, sodium hexametaphosphate and sorbitol, to minimize discoloration. As measured instrumentally, the level of discoloration in response to the removal of the calcium chloride was higher than that experienced when L-cysteine was removed, indicating the significance and the essential role of calcium chloride in the T2 test solution. Removal of sorbitol (T5) or sodium hexametaphosphate (T6) adversely affected discoloration as measured by [a] value and observed visually. The effect, however, is not as strong as when L-cysteine or calcium chloride was removed.

With the exception of L-cysteine which resulted in no adverse effect on heads pace $CO_2\%$ and/or $O_2\%$ when it was removed from the test solution, removal of any of the other three constituents, calcium chloride, sorbitol or sodium hexametaphosphate adversely affected $CO_2\%$ and/or $O_2\%$ levels indicating that the removal of any of these three constituents may adversely effect metabolic rate.

EXAMPLE 3

A test solution (T2) was formulated as follows: a dry mixture of about 53.5% calcium chloride dihydrate, about 17.4% L-cysteine monohydrate, about 10.6% sorbitol and about 18.5% sodium hexametaphosphate was solubilized with water until the concentration of the mixture was about 1.90% of the resulting aqueous solution. Using this same formula, four additional test solutions were formulated, one without L-cysteine (T3), one without calcium chloride (T4), one without sorbitol (T5), and one without sodium hexametaphosphate (T6).

Whole Red Delicious apples were handled and sliced with the skins left on the pieces as indicated in Example 2. One group of the apple pieces was then dipped in ice-cold water (the control, T1), and five other groups were dipped in ice-cold test solutions T2, T3, T4, T5 and T6 for 3 minutes. The treated pieces were then handled, packaged, stored and evaluated at day 7, as indicated in Example 1. The data are indicated in Tables 7 and 8.

As noted in Example 2, this Example also demonstrates the synergy between L-cysteine, calcium chloride, sodium hexametaphosphate and sorbitol in minimizing the discoloration and maintaining the quality of Red Delicious apples pieces over a 7-day storage period. The formula used in this Example had a total strength of 1.90% in aqueous solution compared to 1.83% for the formula used in Example 2. The difference in strength was due to the fact that the formula used in this Example had 3.3 grams/liter L-cysteine as compared to 2.6 grams/liter for the formula used in Example 2.

Basically, the data of this Example support and reinforce the observations and conclusion of Example 2, namely: (1) test solution T2 exhibited the strongest effect on minimizing discoloration when compared to the control, T1, or to the solutions T3, T4, T5 and T6 where one of the constituents was removed; (2) removal of L-cysteine constituent, T3, significantly reduced the effectiveness of the remaining three constituents, calcium chloride, sodium hexametaphosphate and sorbitol; (3) removal of calcium chloride constituent, T4, significantly reduced the effectiveness of the remaining three constituents, L-cysteine, sodium hexametaphosphate, and sorbitol, to minimize discoloration. As measured instrumentally by [L] and [a] values by the Minolta Colorimeter, the level of discoloration in response to the removal of calcium chloride was higher than that experienced when L-cysteine was removed, emphasizing the significance and the essential role of calcium chloride in the T2 test solution; and (4) removal of sodium hexametaphosphate or sorbitol strongly adversely affected discoloration as measured instrumentally by [L] and [a] observed visually.

Under the test condition of this Example, the effect of removal of any of the four constituents did not follow the pattern established in Example 2. This may be affected by the physiological status of the raw apple used in the test.

EXAMPLE 4

A test solution (T3) was formulated as follows: a dry mixture of about 55.5% calcium chloride dihydrate, about 14.4% L-cysteine monohydrate, about 11.0% sorbitol and about 19.1% sodium hexametaphosphate was solubilized with water until the concentration of the mixture was about 1.83% of the resulting aqueous solution. Using this same formula, one additional test solution was formulated without the addition of sodium hexametaphosphate (T2).

Whole fruits of Granny Smith apples grown in three different regions, California, Washington state and British Columbia, were tested. These fruits included two different fruit grades, Extra Fancy and culls. The fruits were handled, sanitized, cored and sliced as indicated in Example 1. One group of apple pieces was then dipped in ice-cold water (the control, T1), and two other groups were dipped in ice-cold test solutions T2 and T3 for 3 minutes. The treated pieces were then handled, packaged, stored and evaluated as indicated in Example 1.

This Example demonstrates the synergy between L-cysteine, calcium chloride and sorbitol (T2), and between L-cysteine, calcium chloride, sorbitol and sodium hexametaphosphate (T3), for retarding the discoloration and maintaining the quality of Granny Smith apple pieces of different growing areas and of different fruit grades.

Discoloration was evaluated with a Minolta Colorimeter ([L] and [a] values) and visually. A subjective sensory evaluation was also made of the smell, taste, texture, and surface (moisture,/dryness) of each test group's pieces. Oxygen and carbon dioxide levels within the packages were measured using a $CO_2/O_2$ gas analyzer to provide an indication of the depletion of oxygen, accumulation of carbon dioxide and to determine if the package environment was reaching anaerobic conditions. All data are recorded on three replicates of this Example. The data of $CO_2\%$ and $O_2\%$ and [L] and [a] values were presented in Table 9 (Granny Smith of California State, Extra Fancy fruit grade), Table 11 (Granny Smith of Washington State, culls fruit grade), and Table 13 (Granny Smith of British Columbia, Canada, Extra Fancy fruit grade). The averages of the sensory evaluations are illustrated in Tables 10, 12 and 14, respectively.

These examples demonstrate the effectiveness of the two treatments, T2 and T3, in retarding the discoloration and maintaining the quality of Granny Smith apple pieces over a 14-day period utilizing fruits of different growing areas, i.e., different growing conditions and different fruit grades. As compared to the control, T1, apple pieces treated with T2 and T3 test solutions exhibited better modified atmospheres inside the packages, minimum changes in discoloration as measured by [L] and [a] values and visually maintained the best overall quality.

The compositions and method of the present invention thus provide a particularly effective commercial food preservative which is usable in very small concentrations to safely, cheaply and effectively prevent the discoloration and blackening of apple pieces for long periods of time. It also provides the food industry with a significant alternative to bisulfites and other food preservatives. Each of the ingredients of the present invention is from the Food and Drug Administration's list of materials generally recognized as safe.

TABLE 5

Headspace CO2 % and O2 % and [L] and [a] Values at Day 11 at 39 F.

| Day/Cultivar | Treatment | CO2 % | O2 % | [L] | [a] |
|---|---|---|---|---|---|
| 11/Red Delicious 1 - Measured Values | | | | | |
| | T1 | 7.6% | 1.1% | 69.12 | 1.09 |
| | T2 | 8.7% | 1.0% | 73.84 | −3.57 |
| | T3 | 11.4% | 0.6% | 72.32 | −1.30 |
| | T4 | 9.1% | 0.7% | 74.33 | −4.74 |
| | T5 | 9.3% | 0.6% | 77.26 | −5.07 |
| 2- Calculated Values Above or Below T2 | | | | | |
| | T1 | −1.1% | 0.1% | −4.12 | 4.66 |
| | T2 | 0.0% | 0.0% | 0.00 | 0.00 |
| | T3 | 2.7% | −0.5% | −1.52 | 2.27 |
| | T4 | 0.4% | −0.3% | 0.49 | −1.17 |
| | T5 | 0.5% | −0.4% | 3.42 | −1.50 |

Note: The higher the [L] value, the lighter the product. The more negative the [a] value, the les discoloration present.

TABLE 6

Sensory Evaluation of Main Parameters at Day 11 at 39

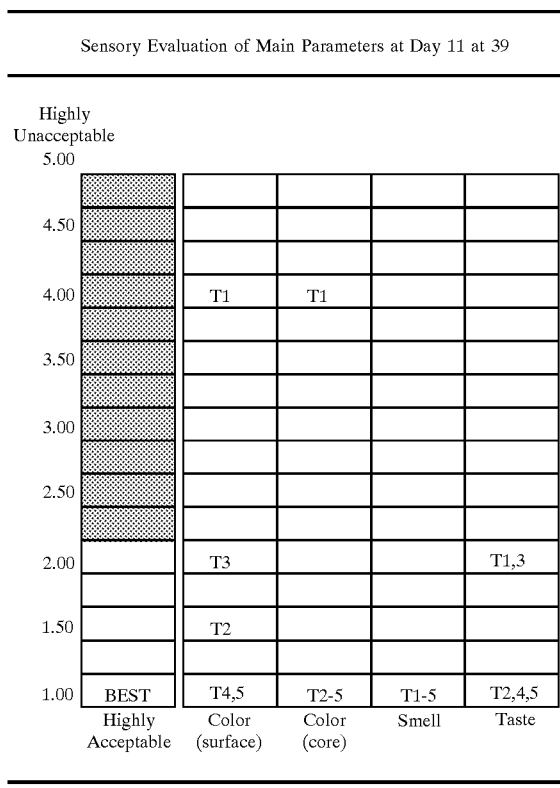

TABLE 7

Headspace CO2 % and O2 %, and [L] and [a] at Day 7 at 39 F.

| Day | Cultivar | Treatment | CO2 % | O2 % | [L] | [a] |
|---|---|---|---|---|---|---|
| 7 | Red Delicious | | | | | |
| | 1- Measured Values | T1 | 7.0% | 5.0% | 70.33 | −0.01 |
| | | T2 | 9.7% | 1.6% | 74.80 | −3.06 |
| | | T3 | 7.7% | 3.5% | 73.57 | −5.60 |
| | | T4 | 10.8% | 1.9% | 71.91 | −1.12 |
| | | T5 | 12.8% | 1.3% | 78.43 | −5.55 |
| | | T6 | 11.4% | 0.8% | 77.78 | −5.42 |
| | 2- Calculated values Above or Below T2 | | | | | |
| | | T1 | −2.7% | 3.4% | −4.47 | 3.05 |
| | | T2 | 0.0% | 0.0% | 0.00 | 0.00 |
| | | T3 | −2.0% | 1.9% | −1.23 | −2.54 |
| | | T4 | 0.8% | 0.3% | −2.89 | 1.94 |
| | | T5 | 3.1% | −0.3% | 1.63 | −2.49 |
| | | T6 | 1.7% | −0.8% | 2.98 | −2.36 |

Note: The higher the [L] value, the lighter the product. The more negative the [a] value, the less discolocation present.

TABLE 8

Sensory Evaluation of Main Parameters at Day 7 at 39° F.

| | | | | | |
|---|---|---|---|---|---|
| Highly Unacceptable 5.0 | | T1,3 | T1,3 | | |
| 4.5 | | | | | |
| 4.0 | | | | | |
| 3.5 | | T4 | | | |
| 3.0 | | | T4 | | |
| 2.5 | | T5,6 | | | |
| 2.0 | | T2 | T5,6 | | |
| 1.5 | | | | | |
| 1.0 | BEST | | T2 | T1-6 | T1-6 |
| | Highly Acceptable | Color (surface) | Color (core) | Smell | Taste |

TABLE 9

Headspace CO2 % and O2 % and [L] and [a] Values at Days 7 and 14 at 39 F.
Fruits were of Extra Fancy Grade of Granny Smith Cutivar of California Stat.

| Days | Cultivar | Parameter | Treatment | Rep 1 | Rep 2 | Rep 3 | Mean | SD |
|---|---|---|---|---|---|---|---|---|
| 7 | Granny Smith | CO2 % | T1 | 10.8% | 10.9% | 9.7% | 10.5% | 0.7% |
| | | | T2 | 12.4% | 13.3% | 12.6% | 12.8% | 0.5% |
| | | | T3 | 11.2% | 11.2% | 11.8% | 11.4% | 0.3% |
| | | O2 % | T1 | 2.24% | 0.70% | 2.85% | 1.93% | 1.11% |
| | | | T2 | 0.54% | 0.57% | 0.48% | 1.25% | 0.05% |
| | | | T3 | 0.84% | 1.18% | 0.47% | 0.83% | 0.36% |

TABLE 9-continued

Headspace CO2 % and O2 % and [L] and [a] Values at Days 7 and 14 at 39 F.
Fruits were of Extra Fancy Grade of Granny Smith Cutivar of California Stat.

| Days | Cultivar | Parameter | Treatment | Rep 1 | Rep 2 | Rep 3 | Mean | SD |
|---|---|---|---|---|---|---|---|---|
| 14 | | CO2% | T1 | 13.1% | 13.1% | 12.2% | 12.8% | 0.5% |
| | | | T2 | 13.6% | 13.6% | 15.1% | 14.1% | 0.9% |
| | | | T3 | 13.9% | 11.8% | 15.0% | 13.6% | 1.6% |
| | | O2 % | T1 | 0.22% | 0.36% | 0.24% | 0.27% | 0.07% |
| | | | T2 | 0.39% | 0.49% | 0.27% | 0.38% | 0.11% |
| | | | T3 | 0.27% | 0.37% | 0.29% | 0.31% | 0.05% |
| 0 | | [L] | | | | | 79.37 | 0.44 |
| | | [a] | | | | | −5.88 | 1.08 |
| 7 | | [L] | T1 | 73.75 | 71.37 | 70.61 | 71.91 | 1.64 |
| | | | T2 | 75.57 | 77.42 | 76.30 | 76.43 | 0.93 |
| | | | T3 | 76.69 | 78.88 | 77.76 | 77.78 | 1.10 |
| | | [a] | T1 | −1.97 | −0.42 | −0.96 | −1.12 | 0.79 |
| | | | T2 | −5.41 | −6.29 | −4.95 | −5.55 | 0.68 |
| | | | T3 | −5.40 | −5.93 | −4.92 | −5.42 | 0.51 |
| 14 | | [L] | T1 | 71.31 | 70.85 | 69.97 | 70.71 | 0.68 |
| | | | T2 | 72.32 | 73.83 | 74.87 | 73.67 | 1.28 |
| | | | T3 | 77.93 | 75.86 | 75.87 | 76.55 | 1.19 |
| | | [a] | T1 | −1.39 | −1.22 | −1.52 | −1.38 | 0.15 |
| | | | T2 | −2.68 | −1.23 | −1.84 | −1.92 | 0.72 |
| | | | T3 | −4.93 | −4.08 | −3.68 | −4.23 | 0.64 |

TABLE 10

Sensory Evaluation of Main Parameters.

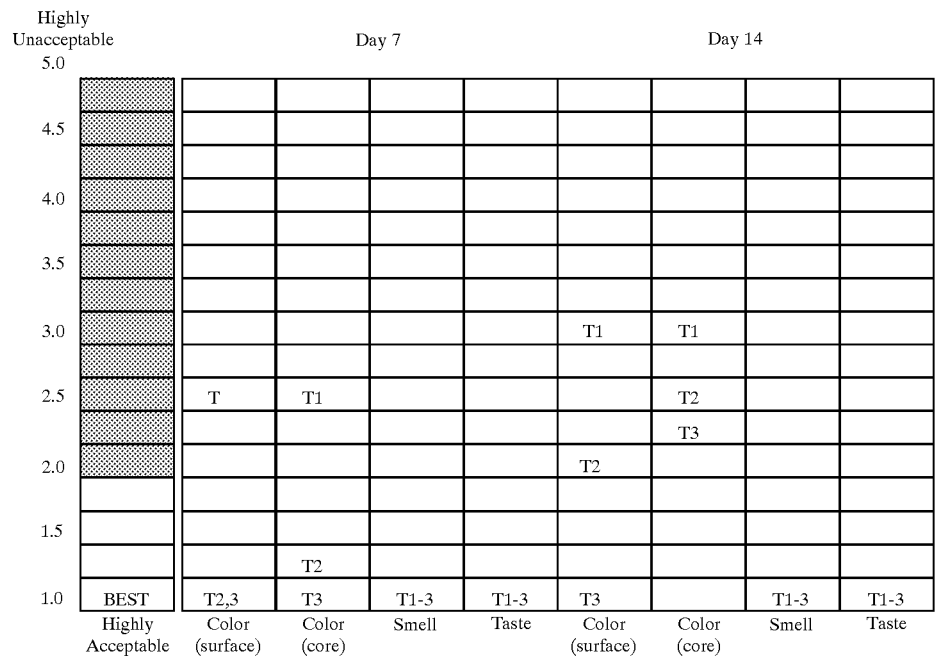

Granny Smith, CA State, Extra Fancy

TABLE 11

Headspace CO2 % and O2 % and [L] and [a] Values at Days 7 and 14 at 39 F. Fruits were of Culls Grade of Granny Smith of Washington State.

| Days | Cultivar | Parameter | Treatment | Rep 1 | Rep 2 | Rep 3 | Mean | SD |
|---|---|---|---|---|---|---|---|---|
| 7 | Granny Smith | CO2 % | T1 | 14.1% | 15.0% | 15.2% | 14.8% | 0.5% |
| | | | T2 | 13.6% | 13.7% | 13.3% | 13.5% | 0.2% |
| | | | T3 | 14.0% | 15.0% | 12.8% | 13.9% | 0.9% |
| | | O2% | T1 | 0.5% | 0.6% | 0.3% | 0.4% | 0.1% |
| | | | T2 | 0.7% | 0.8% | 0.5% | 0.6% | 0.1% |
| | | | T3 | 0.5% | 0.4% | 0.5% | 0.5% | 0.1% |
| 14 | | CO2 % | T1 | 16.8% | 17.7% | 21.4% | 18.6% | 2.0% |
| | | | T2 | 20.1% | 16.0% | 18.9% | 18.3% | 1.7% |
| | | | T3 | 16.6% | 18.0% | 20.0% | 18.2% | 1.4% |
| | | O2 % | T1 | 0.2% | <0.01% | <0.01% | 0.1% | 0.1% |
| | | | T2 | 0.3% | 1.2% | 0.7% | 0.7% | 0.4% |
| | | | T3 | 0.6% | 0.4% | 0.6% | 0.5% | 0.1% |
| 0 | | [L] | | | | | 78.27 | 5.22 |
| | | [a] | | | | | −6.28 | 0.70 |
| 7 | | [L] | T1 | 70.22 | 67.04 | 67.01 | 68.09 | 1.51 |
| | | | T2 | 77.48 | 76.26 | 77.00 | 76.91 | 0.49 |
| | | | T3 | 78.12 | 78.55 | 78.21 | 78.29 | 0.19 |
| | | [a] | T1 | −2.07 | 0.70 | 0.64 | −0.24 | 1.29 |
| | | | T2 | −5.16 | −4.18 | −3.10 | −4.15 | 0.84 |
| | | | T3 | −6.44 | −5.84 | −5.94 | −6.07 | 0.26 |
| 14 | | [L] | T1 | 71.86 | 71.18 | 70.60 | 71.21 | 0.51 |
| | | | T2 | 77.09 | 72.99 | 74.22 | 74.77 | 1.72 |
| | | | T3 | 77.40 | 74.27 | 77.31 | 76.33 | 1.45 |
| | | [a] | T1 | −1.73 | −0.83 | −1.51 | −1.36 | 0.38 |
| | | | T2 | −2.81 | 0.33 | 0.95 | −0.51 | 1.65 |
| | | | T3 | −3.37 | −1.27 | −2.36 | −2.33 | 0.86 |

TABLE 12

Sensory Evaluation of Main Parameters.

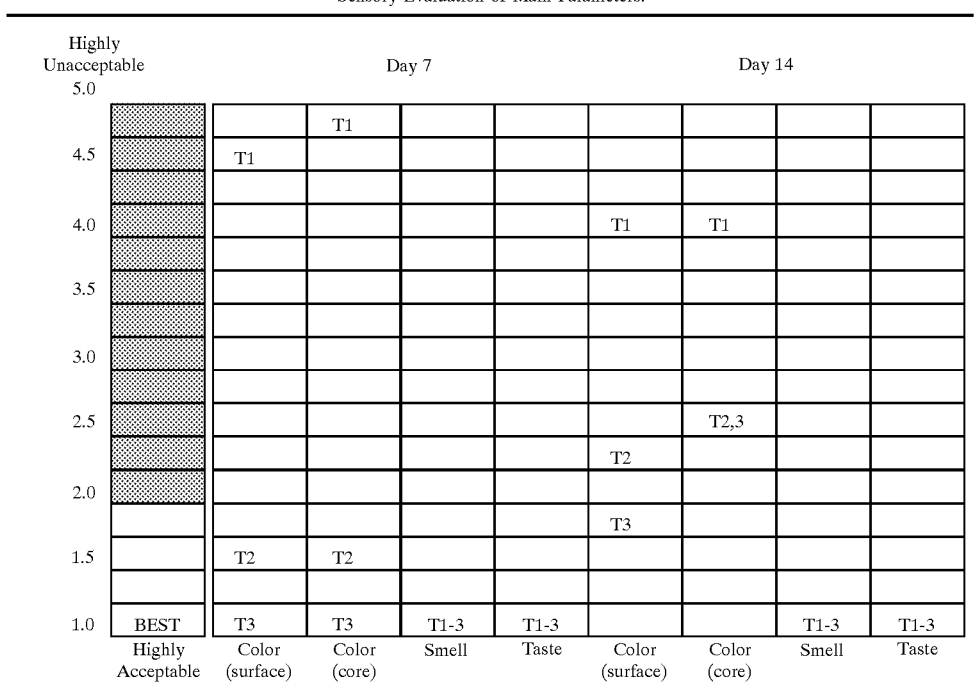

Granny Smith, WA State, Culls

TABLE 13

Headspace CO2 % and O2 % and [L] and [a] Values at Days 7 and 14 at 39 F.
Fruits were of Extra Fancy Grade of Granny Smith Cultivar of British Columbia, Canada.

| Days | Cultivar | Parameter | Treatment | Rep 1 | Rep 2 | Rep 3 | Mean | SD |
|---|---|---|---|---|---|---|---|---|
| 7 | Granny Smith | CO2 % | T1 | 11.4% | 12.6% | 10.3% | 11.4% | 0.9% |
|  |  |  | T2 | 13.0% | 14.0% | 13.1% | 13.4% | 0.4% |
|  |  |  | T3 | 13.8% | 15.5% | 12.9% | 14.1% | 1.1% |
|  |  | O2 % | T1 | 0.2% | 0.3% | 1.9% | 0.8% | 0.8% |
|  |  |  | T2 | 0.4% | 0.5% | 0.5% | 0.5% | 0.1% |
|  |  |  | T3 | 0.5% | 0.7% | 0.7% | 0.8% | 0.1% |
| 14 |  | CO2 % | T1 | 12.9% | 14.6% | 12.7% | 13.4% | 0.9% |
|  |  |  | T2 | 15.5% | 15.3% | 14.3% | 15.0% | 0.5% |
|  |  |  | T3 | 19.2% | 16.7% | 19.0% | 18.3% | 1.1% |
|  |  | O2 % | T1 | 1.1% | 0.3% | 1.9% | 1.1% | 0.7% |
|  |  |  | T2 | 0.3% | 0.3% | 1.7% | 0.8% | 0.6% |
|  |  |  | T3 | 0.7% | 0.7% | <0.01% | 0.4% | 0.3% |
| 0 |  | [L] |  |  |  |  | 81.78 | 0.64 |
|  |  | [a] |  |  |  |  | -6.01 | 1.12 |
| 7 |  | [L] | T1 | 75.48 | 71.85 | 74.64 | 73.99 | 1.55 |
|  |  |  | T2 | 78.99 | 81.13 | 80.21 | 80.11 | 0.88 |
|  |  |  | T3 | 82.43 | 81.61 | 79.72 | 81.25 | 1.13 |
|  |  | [a] | T1 | -0.79 | 1.08 | 0.43 | 0.24 | 0.78 |
|  |  |  | T2 | -5.42 | -4.50 | -5.50 | -5.14 | 0.45 |
|  |  |  | T3 | -4.80 | -5.03 | -4.78 | -4.87 | 0.11 |
| 14 |  | [L] | T1 | 70.65 | 70.79 | 70.54 | 70.66 | 0.10 |
|  |  |  | T2 | 79.31 | 76.28 | 76.37 | 77.32 | 1.41 |
|  |  |  | T3 | 79.42 | 78.17 | 79.09 | 78.89 | 0.53 |
|  |  | [a] | T1 | -0.18 | 0.33 | -0.37 | -0.07 | 0.30 |
|  |  |  | T2 | -3.79 | -0.71 | -2.56 | -2.35 | 1.27 |
|  |  |  | T3 | -3.41 | -1.84 | -2.78 | -2.68 | 0.65 |

TABLE 14

Sensory Evaluation of Main Parameters.

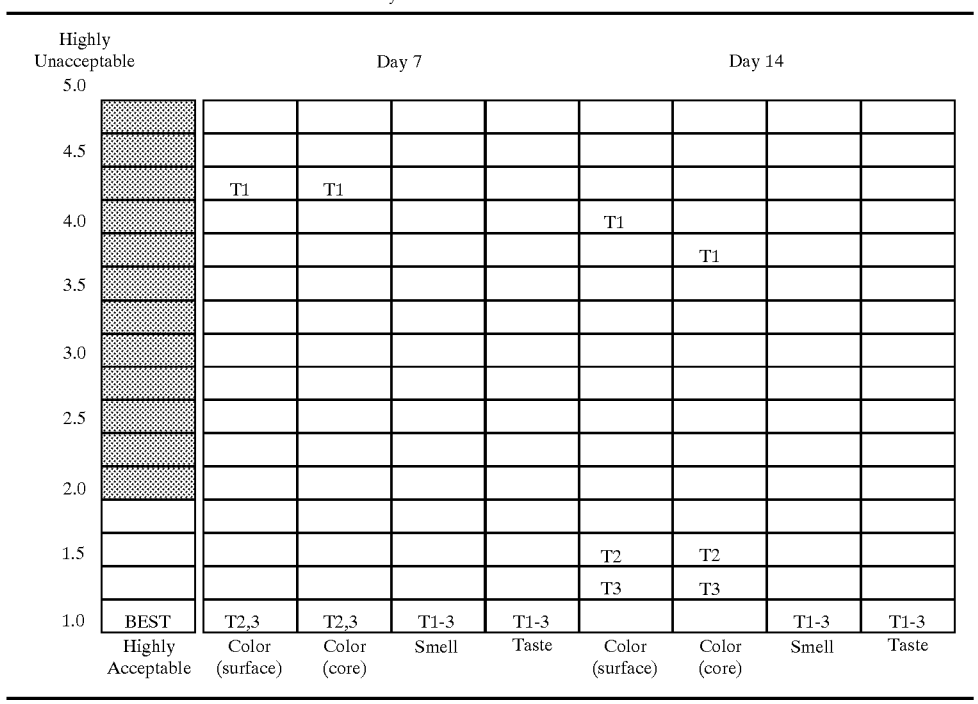

We claim:

1. A method for retarding the browning, loss of texture, and change in flavor of freshly-cut apple pieces, comprising the steps of cutting an apple for consumption and exposing the cut apple pieces to an aqueous solution comprising an antioxidant selected from the group consisting of L-cysteine, D-cysteine and D.L-cysteine in a weight percentage concentration of from about 0.1 to about 0.4 percent of the solution, a calcium source selected from the group consisting of calcium chloride and calcium lactate in a weight percentage concentration of from about 0.1 to about 1.0 percent of the solution, and an osmolite selected from the group consisting of alcohol sugars that are not metabolized by bacteria in a weight percentage concentration of from about 0.2 to about 1.0 percent of the solution, and the remainder water, said exposing step including contacting the cut apple pieces with said solution for a time sufficient such that the contacting step retards the browning, loss of texture, and change in flavor of the cut apple pieces when the cut apple pieces are exposed to an atmosphere that would cause browning, loss of texture, and change in flavor of the apple pieces in the absence of said contacting step, rinsing excess aqueous solution from said apple pieces after said exposing step and packaging said apple pieces after said rinsing step in protective film means that retards oxidative reactions within the packaging.

2. The method of claim 1 and further comprising a metal ion chelator selected from the group consisting of sodium hexametaphosphate and calcium hexametaphosphate added to said solution in a weight percentage concentration of from about 0.2 to about 1.0 percent of the solution.

3. The method of claim 2 wherein said solution comprises L-cysteine, calcium chloride, sorbitol, and sodium hexametaphosphate.

4. The method of claim 1 and further comprising cooling said solution to between about 3 C. and ambient temperature prior to the exposing step.

5. The method of claim 1 wherein said solution comprises L-cysteine, calcium chloride, and sorbitol.

6. The method of claim 1 where said packaging step includes protective film that will equilibrate the oxygen and carbon dioxide levels within the package from about 0.1 to about 5.0 percent oxygen and from about 7.0 to about 30.0 percent carbon dioxide.

7. An aqueous solution for retarding the browning, loss of texture, and change in flavor of freshly-cut apple pieces, comprising an antioxidant selected from the group consisting of L-cysteine, D-cysteine and D.L-cysteine in a weight percentage concentration of from about 0.1 to about 0.4 percent of the solution, a calcium source selected from the group consisting of calcium chloride and calcium lactate in a weight percentage concentration of from about 0.1 to about 1.0 percent of the solution, and an osmolite selected from the group consisting of alcohol sugars that are not metabolized by bacteria in a weight percentage of from about 0.2 to about 1.0 percent of the solution, and the remainder water.

8. The aqueous solution of claim 7 and further comprising a metal ion chelator selected from the group consisting of sodium hexametaphosphate and calcium hexametaphosphate added to said solution in a weight percentage concentration of from about 0.2 to about 1.0 percent of the solution.

9. The aqueous solution of claim 8 wherein said solution comprises L-cysteine, calcium chloride, sorbitol, and sodium hexametaphosphate.

10. The aqueous solution of claim 7 wherein said solution comprises L-cysteine, calcium chloride, and sorbitol.

* * * * *

UNITED STATES PATENT AND TRADEMARK OFFICE
CERTIFICATE OF CORRECTION

PATENT NO. : 6,054,160  
DATED : April 25, 2000  
INVENTOR(S) : Kamelya I. Gawad; Hesham A. Gawad Page 1 of 2

It is certified that error appears in the above-identified patent and that said Letters Patent is hereby corrected as shown below:

Under OTHER PUBLICATIONS, please insert --Richard-Forget, F.C. et al., 1992, Cysteine as an inhibitor of enzymatic browning. 2. Kinetic studies. J. Agric, Food. Chem. 40:2108.--

In the ABSTRACT, after the word "agent." and before the word "A", please insert --Cysteine is present in a concentration of 1.00-4.00 g/l of solution, sorbitol at 2.00 g/l, and calcium chloride at 1.0-10.0 g/l. The ratios of these compounds are altered to meet the different needs of specific apple cultivars, condition of the raw materials and distribution requirements. Apple cultivars that have responded to this treatment in combination with the appropriate modified atmosphere packaging include Empire, Fuji, Granny Smith, Golden Delicious, Red Delicious, Ida Red, Pippin, Rome, and Gravenstein.--

In the ABSTRACT, after the word "respectively.", please insert -- The formulation, concentration, treatment parameters, packaging film, and packaging type (e.g. tray, bags) are selected based on the specific cultivar, the quality of the starting raw material, the final product specs, and the distribution channels. Raw material specs are characterized by pressure, starch content, and soluble sugars. The treatment protocol in the processing plant is designed to meet the needs of individual apple processors.--

Column 8,  
Line 18 of Table 2, please add --Fuji-- before "1– Measured Values".

Column 9,  
Line 18 of Table 3, please add --Fuji-- before "1– Measured Values".

Column 15,  
Line 8 of Table 7, please change "10.8%" to -- 10.5%--.  
Line 9 of Table 7, please change "78.43" to --76.43--.

Column 16,  
Last line of Table 7, please change "discoloration" to --discoloration--.  
Line 2 of Table 9, please change "Stat ." to --State--.  
Line 9 of Table 9, please change "0.48%" to --0.46%--.

UNITED STATES PATENT AND TRADEMARK OFFICE
CERTIFICATE OF CORRECTION

PATENT NO.   : 6,054,160
DATED        : April 25, 2000
INVENTOR(S)  : Kamelya I. Gawad; Hesham A. Gawad It is certified that error appears in the above-identified patent and that said Letters Patent is hereby corrected as shown below:

Column 17,
Line 3 of Table 9-continued, please change "Stat." to --State--.
Line 23 of Table 9-continued, please change "-2.68" to -- -2.66--.
Line 23 of Table 9-continued, please change "-1.92" to -- -1.91--.

Column 19,
Line 9 of Table 11, please change "0.8%" to --0.6%--.
Line 20 of Table 11, please change "77.48" to --77.46--.

Column 21,
Line 10 of Table 13, please change "0.8%" to --0.6%--.

Signed and Sealed this

Seventh Day of August, 2001

*Attest:*

NICHOLAS P. GODICI
*Attesting Officer*   Acting Director of the United States Patent and Trademark Office